(12) United States Patent
Chen et al.

(10) Patent No.: US 9,143,990 B2
(45) Date of Patent: Sep. 22, 2015

(54) METHOD AND DEVICE FOR HANDLING FAILURE OF MOBILITY MANAGEMENT DEVICE IN ISR ACTIVATED SCENARIO

(71) Applicant: Huawei Technologies Co., Ltd., Shenzhen, Guangdong (CN)

(72) Inventors: Zhongping Chen, Shanghai (CN); Wenfu Wu, Shanghai (CN); Feng Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 201 days.

(21) Appl. No.: 14/064,866

(22) Filed: Oct. 28, 2013

(65) Prior Publication Data

US 2014/0050199 A1 Feb. 20, 2014

Related U.S. Application Data

(63) Continuation of application No. PCT/CN2011/073539, filed on Apr. 29, 2011.

(51) Int. Cl.
*H04W 36/00* (2009.01)
*H04W 24/04* (2009.01)
*H04W 76/02* (2009.01)
(Continued)

(52) U.S. Cl.
CPC .......... *H04W 36/0022* (2013.01); *H04W 24/04* (2013.01); *H04W 76/027* (2013.01); *H04W 28/04* (2013.01); *H04W 68/12* (2013.01); *H04W 76/041* (2013.01); *H04W 88/16* (2013.01)

(58) Field of Classification Search
CPC ............ H04W 36/0055; H04W 68/12; H04W 76/068
USPC .......................................... 370/329; 455/433
See application file for complete search history.

(56) References Cited

U.S. PATENT DOCUMENTS 8,848,516 B2 * 9/2014 Sahin et al. .................... 370/225
2010/0061331 A1 * 3/2010 Guo et al. ...................... 370/329

FOREIGN PATENT DOCUMENTS

| CN | 101534566 A | 9/2009 |
| CN | 101540990 A | 9/2009 |

(Continued)

OTHER PUBLICATIONS

"3GPP TS 23.007—3$^{rd}$ Generation Partnership Project; Technical Specification Group Core Network and Terminals; Restoration procedures (Release 10)," Version 10.3.0, 3$^{rd}$ Generation Partnership Project, Valbonne, France (Mar. 2011).

(Continued)

*Primary Examiner* — Wanda Z Russell
(74) *Attorney, Agent, or Firm* — Leydig, Voit & Mayer, Ltd.

(57) ABSTRACT

Embodiments of the present invention relate to a method and device for handling a failure of a mobility management device in an ISR activated scenario. The method includes: detecting, by a serving gateway, a failure of a first mobility management device; and when the serving gateway receives downlink user plane or control plane data of a user equipment, paging, by the serving gateway, the user equipment using a downlink data notification message including identity information of the user equipment, in a first radio access network connected to the first mobility management device.

18 Claims, 5 Drawing Sheets

(51) Int. Cl.
  *H04W 28/04*   (2009.01)
  *H04W 88/16*   (2009.01)
  *H04W 68/12*   (2009.01)
  *H04W 76/04*   (2009.01)

(56) References Cited

FOREIGN PATENT DOCUMENTS

| CN | 101572943 A | 11/2009 |
|---|---|---|
| WO | WO 2011026663 A2 | 3/2011 |

OTHER PUBLICATIONS

"3GPP TS 23.401—3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 10)," Version 10.3.0, 3$^{rd}$ Generation Partnership Project, Valbonne, France (Mar. 2011).

"3GPP TR 23.857—3$^{rd}$ Generation Partnership Project; Technical Specification Group Core Network and Terminals; Study of EPC Nodes Restoration; (Release 10)," Version 1.2.0, 3$^{rd}$ Generation Partnership Project, Valbonne, France (Feb. 2011).

"Pseudo-CR on handling of ISR mode UEs upon MME failure," 3GPP TSG CT4 Meeting #52, Salt Lake City, U.S., Document C4-110865, 3$^{rd}$ Generation Partnership Project, Valbonne, France (Feb. 21-25, 2011).

"MME/SGSN restart and restoration procedure," Change Request, 3GPP TSG CT4 Meeting #52, Salt Lake City, U.S., Document C4-110934, 3$^{rd}$ Generation Partnership Project, Valbonne, France (Feb. 21-25, 2011).

International Search Report Completed within the State Intellectual Property Office, P.R. China for PCT/CN2011/073539 (WO2011/116722 A3), Jan. 11, 2012.

* cited by examiner

METHOD AND DEVICE FOR HANDLING FAILURE OF MOBILITY MANAGEMENT DEVICE IN ISR ACTIVATED SCENARIO

CROSS-REFERENCE TO RELATED APPLICATIONS

This application is a continuation of International Patent Application No. PCT/CN2011/073539, filed on Apr. 29, 2011, which is hereby incorporated by reference in its entirety.

TECHNICAL FIELD

Embodiments of the present invention relate to mobile communications technologies, and in particular, to a method and device for handling a failure of a mobility management device in an ISR activated scenario.

BACKGROUND

In the process of development toward broadband and mobile networks, the 3rd Generation Partnership Project (3rd Generation Partnership Program, 3GPP) has proposed a long term evolution (Long Term Evolution, LTE) solution for a mobile access network, namely, an evolved universal mobile telecommunications system (UMTS) terrestrial radio access network (Evolved Universal Mobile Telecommunication System Territorial Radio Access Network, E-UTRAN), and a system architecture evolution (System Architecture Evolution, SAE) solution for a mobile core network, namely, an evolved packet core network (Evolved Packet Core, EPC). The E-UTRAN and EPC constitute an evolved packet system (Evolved Packet System, EPS). A user equipment (User Equipment, UE) may access the EPC through the E-UTRAN, and may also access the EPC through a universal mobile telecommunications system terrestrial radio access network (Universal Mobile Telecommunication System Territorial Radio Access Network, UTRAN) or a global system for mobile communications (Global System for Mobile Communications, GSM)/enhanced data rate for GSM evolution (Enhanced Data rate for GSM Evolution, EDGE) radio access network (GSM EDGE Radio Access Network, GERAN).

Idle mode signaling reduction (Idle mode Signaling Reduction, ISR) is a mechanism provided for reducing signaling interaction when a UE in an idle mode reselects a radio access network. ISR may include two states: an activated state and a deactivated state. For example, the UE performs reselection between the E-UTRAN and the UTRAN/GERAN. In an ISR activated scenario, the UE needs to register with a mobility management entity (Mobility Management Entity, MME) in the E-UTRAN and a serving general packet radio service (General Packet Radio Service, GPRS) support node (Serving GPRS Supporting Node, SGSN) in the UTRAN/GERAN simultaneously. In the ISR activated scenario, a serving gateway (Serving GateWay, S-GW) maintains connection information of the MME and connection information of the SGSN simultaneously. The MME and SGSN store connection information of each other, that is, the MME stores connection information of the SGSN, and the SGSN stores connection information of the MME. Storing, by the S-GW, connection information of the MME and connection information of the SGSN simultaneously means ISR activation for the S-GW; storing, by the MME and SGSN, connection information of each other means ISR activation for the MME and SGSN.

In the ISR activated scenario, when the S-GW receives downlink user plane or control plane data of the UE, the S-GW triggers, according to the stored connection information of the MME and connection information of the SGSN, the corresponding MME and SGSN to page the UE. Therefore, no matter whether the UE currently camps in the E-UTRAN or UTRAN/GERAN, the UE can respond to a paging message of the network (that is, a mobile terminating service of the UE is available).

However, in the ISR activated scenario, in the case of an MME failure, for example, MME restart (Restart, which may also be referred to as reset, Reset) and non-restart, the SGSN and S-GW can detect the MME failure, and then execute an ISR deactivation operation respectively, that is, delete the stored connection information of the MME respectively. In this case, when the S-GW receives the downlink user plane or control plane data of the UE, because the S-GW has deactivated ISR, only the SGSN is triggered to page the UE. If the UE camps in the E-UTRAN at this time, the UE cannot receive the paging message sent by the SGSN, resulting in interruption of the mobile terminating service (that is, the mobile terminating service is unreachable), and thereby reducing reliability of the mobile terminating service. A same problem also exists when the SGSN restarts.

SUMMARY

Embodiments of the present invention provide a method and device for handling a failure of a mobility management device in an ISR activated scenario, so as to avoid a problem that in an ISR activated scenario, a mobile terminating service of a UE camping in a first radio access network is interrupted, which is caused by deactivating ISR by a serving gateway because the serving gateway detects a failure of a first mobility management device connected to the first radio access network.

An embodiment of the present invention provides a method for handling a failure of a mobility management device in an ISR activated scenario, including:

detecting, by a serving gateway, a failure of a first mobility management device; and when the serving gateway receives downlink user plane or control plane data of a user equipment, paging, by the serving gateway, the user equipment using a downlink data notification message including identity information of the user equipment, in a first radio access network connected to the first mobility management device; and paging, by the serving gateway, the user equipment using a downlink data notification message not including identity information of the user equipment, in a second radio access network connected to a second mobility management device.

An embodiment of the present invention further provides a serving gateway in an ISR activated scenario, including:

a detecting unit, configured to detect a failure of a first mobility management device; and a handling unit, configured to: when downlink user plane or control plane data of a user equipment is received, page the user equipment using a downlink data notification message including identity information of the user equipment, in a first radio access network connected to the first mobility management device; and page the user equipment using a downlink data notification message not including identity information of the user equipment, in a second radio access network connected to a second mobility management device.

An embodiment of the present invention further provides a mobility management device in an ISR activated scenario, including:

a detecting unit, configured to detect a failure of another mobility management device of a type different from the mobility management device; and a handling unit, configured to:

when a routing area update request message or a tracking area update request message is received, send a first modify bearer request message to a serving gateway, where the first modify bearer request message includes ISR deactivated indication information, or when a service request message or a protocol data unit is received, send a second modify bearer request message to a serving gateway, where the second modify bearer request message includes ISR activated indication information, or when it is determined that a user equipment needs to be detached, send a delete session request message to a serving gateway, so that the serving gateway notifies a packet data network gateway of deleting a corresponding session.

As can be known from the foregoing technical solutions, the embodiments of the present invention are capable of avoiding the problem that in an ISR activated scenario, a mobile terminating service of a UE camping in a first radio access network is interrupted, which is caused by deactivating ISR by a serving gateway because the serving gateway detects a failure of a first mobility management device connected to the first radio access network, thereby improving reliability of the mobile terminating service.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The method and device provided by the embodiments of the present invention are applicable to an ISR activated scenario. In the embodiments, a first mobility management device is connected to a first radio access network, and a second mobility management device is connected to a second radio access network. A serving gateway currently serving a user equipment simultaneously maintains connections to the first mobility management device and second mobility management device with which the user equipment registers, that is, the serving gateway stores connection information of the first mobility management device, which may be, for example, a fully qualified tunnel endpoint identifier (Fully Qualified Tunnel Endpoint Identifier, F-TEID) of the first mobility management device, or may also be an IP address and a tunnel endpoint identifier (Tunnel Endpoint Identifier, TEID) of the first mobility management device, and connection information of the second mobility management device, which may be, for example, an F-TEID of the second mobility management device, or may also be an IP address and a TEID of the second mobility management device. The first mobility management device and second mobility management device with which the UE registers store connection information of each other, that is, the first mobility management device stores connection information of the second mobility management device, and the second mobility management device stores connection information of the first mobility management device.

Figure 1:
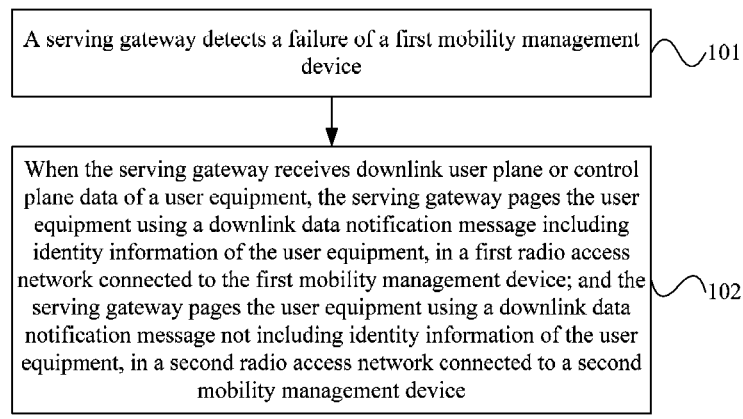
FIG. 1 is a schematic flowchart of a method for handling a failure of a mobility management device in an ISR activated scenario according to an embodiment of the present invention.

FIG. 1 is a schematic flowchart of a method for handling a failure of a mobility management device in an ISR activated scenario according to an embodiment of the present invention. As shown in FIG. 1, the method for handling reset or restart of a mobility management device in an ISR activated scenario in this embodiment may include the following steps:

101. A serving gateway detects a failure of a first mobility management device.

102. When the serving gateway receives downlink user plane or control plane data of a user equipment, the serving gateway pages the user equipment using a downlink data notification message including identity information of the user equipment, in a first radio access network connected to the first mobility management device; and the serving gateway pages the user equipment using a downlink data notification message not including identity information of the user equipment, in a second radio access network connected to a second mobility management device.

It can be understood that in step 101, the failure of the first mobility management device detected by the serving gateway may be restart or may also be non-restart.

For example, if the serving gateway detects that the failure of the first mobility management device is restart, the serving gateway may send a downlink data notification message including identity information of the user equipment to the first mobility management device or another mobility management device of a same device type as the first mobility management device, so as to trigger the first mobility management device or the another mobility management device to page the user equipment in the first radio access network.

For another example, if the serving gateway detects that the failure of the first mobility management device is non-restart, the serving gateway may send a downlink data notification message including identity information of the user equipment to another mobility management device of a same device type as the first mobility management device, so as to trigger the first mobility management device or the another mobility management device to page the user equipment in the first radio access network.

Specifically, the manner in which the serving gateway detects that the failure of the first mobility management device is restart may be but is not limited to the following:

The serving gateway may detect restart of the first mobility management device using an echo message. Specifically, the serving gateway may send an echo request (Echo Request) message to the first mobility management device, and then receive an echo response (Echo Response) message sent by the first mobility management device, where the echo response message includes a restart counter (restart counter) value. The serving gateway may detect restart of the first mobility management device using the restart counter value. For another example, the first mobility management device sends an echo request (Echo Request) message to the serving gateway during restart, where the echo request message includes a restart counter (restart counter) value. The serving gateway may detect restart of the first mobility management device using the restart counter value.

Specifically, the manner in which the serving gateway detects that the failure of the first mobility management device is non-restart may be but is not limited to the following:

The serving gateway may detect non-restart of the first mobility management device using an echo message. Specifically, the serving gateway may send an echo request (Echo Request) message to the first mobility management device, and no echo response (Echo Response) is received yet after the response times out. In this case, the serving gateway may select to resend the echo request message to the first mobility management device. If the echo request message is still not received after many times of resending, the serving gateway detects non-restart of the first mobility management device (that is, the failure is non-restart).

Optionally, after the serving gateway detects the failure of the first mobility management device, the serving gateway may further set a failure flag of the first mobility management device. Correspondingly, in step 102, when the serving gateway receives the downlink user plane or control plane data of the user equipment, the serving gateway may page, according to the failure flag, the user equipment using a downlink data notification message including identity information of the user equipment, in the first radio access network connected to the first mobility management device.

The method for setting, by the serving gateway, the failure flag of the first mobility management device may include but is not limited to the following manners:

(1) The serving gateway may set a specific flag in a user equipment context, for example, the failure flag of the first mobility management device (for example, "Failure Flag").

Specifically, once detecting the failure of the first mobility management device, the serving gateway may set the failure flag of the first mobility management device in the user equipment context. If the failure flag of the first mobility management device already exists in the user equipment context, the failure flag of the first mobility management device is set from invalid to valid. Further, the failure flag of the first mobility management device may distinguish different failure types of the first mobility management device. In addition, the serving gateway deletes the failure flag of the first mobility management device, which means that the failure flag of the first mobility management device is cleared from the user equipment context or that the failure flag of the first mobility management device is set from valid to invalid.

(2) The serving gateway may set the TEID of the first mobility management device stored in the user equipment context to a specific value.

Specifically, the serving gateway may further use different values of the TEID (for example, if the value is all-1, it represents that the failure of the first mobility management device is restart; if the value is all-0, it represents that the failure of the first mobility management device is non-restart) to distinguish different failure types of the first mobility management device. In addition, the serving gateway deletes the failure flag of the first mobility management device, which means that the TEID of the first mobility management device is cleared from the user equipment context or that the TEID is updated and no longer the foregoing specific value.

(3) The serving gateway may start a specific timer.

Specifically, different failure types of the first mobility management device may correspond to different specific timers. For example, different names of specific timers are used to distinguish different failure types of the first mobility management device. In addition, after the specific timer times out, the serving gateway may locally deactivate ISR. Generally speaking, a duration of the specific timer is slightly longer than a duration of a specific periodic update timer of the user equipment. In addition, the serving gateway deletes the failure flag of the first mobility management device, which means that the specific timer is cleared from the user equipment context or that the specific timer stops running.

Optionally, after the serving gateway sets the failure flag of the first mobility management device, the serving gateway may further receive a first modify bearer request message, where the first modify bearer request message includes ISR deactivated indication information. In this case, the serving gateway may execute an ISR deactivation operation (that is, to delete stored connection information of the first mobility management device) according to the ISR activated indication information, and delete the failure flag.

Optionally, after the serving gateway sets the failure flag of the first mobility management device, the serving gateway may further receive a second modify bearer request message, where the second modify bearer request message includes ISR activated indication information. If the serving gateway determines that the second modify bearer request message is triggered by a service request message or a protocol data unit, the serving gateway may, according to the ISR activated indication information, continue to maintain ISR (that is, continue to store connection information of the first mobility management device) and continue to store the failure flag; if the serving gateway determines that the second modify bearer request message is triggered by a routing area update request message or a tracking area update request message, the serving gateway may, according to the ISR activated indication information, execute an ISR reactivation operation (that is, the connection information of the first mobility management device is updated, and the updated connection information of the first mobility management device is stored in the second modify bearer request message) and delete the failure flag. Specifically, after receiving the second modify bearer request message, the serving gateway may specifically determine a trigger condition of the second modify bearer request message according to whether the second modify bearer request message includes a downlink data packet notification request delay information element; and if the second modify bearer request message includes the downlink data packet notification request delay information element, determine that the second modify bearer request message is triggered by the service request message or protocol data unit; or if the second modify bearer request message does not include the downlink data packet notification request delay information element, determine that the second modify bearer request message is triggered by the routing area update request message or tracking area update request message.

The first modify bearer request message is sent after the second mobility management device receives the routing area update request message or tracking area update request message.

Further, in this embodiment, the second mobility management device may further detect the failure of the first mobility management device, so that the second mobility management device executes different operations.

For example, the second mobility management device may send the first modify bearer request message to the serving gateway when receiving the routing area update (Routing Area Update, RAU) request (RAU Request) message or tracking area update (Tracking Area Update, TAU) request (TAU Request) message.

For another example, the second mobility management device may send the second modify bearer request message to the serving gateway when receiving the service request message or protocol data unit.

For another example, when determining that the user equipment is in a connected state or a ready state, the second mobility management device may trigger the UE to initiate an RAU procedure or a TAU procedure, where the second mobility management device may allocate a second location area identity that does not match a current first location area identity of the user equipment to the user equipment, so that the user equipment can trigger, according to the first location area identity and the second location area identity, the UE to initiate an RAU procedure or a TAU procedure, that is, send a routing area update request (RAU Request) message or a tracking area update request (TAU Request) message to the second mobility management device.

For another example, the second mobility management device may send a delete session request message to the serving gateway when determining that the user equipment needs to be detached, so that the serving gateway notifies a packet data network gateway of deleting a corresponding session.

It can be understood that the second mobility management device detects that the failure of the first mobility management device may be restart or may also be non-restart.

Specifically, the manner in which the second mobility management device detects that the failure of the first mobility management device is restart may be but is not limited to the following:

The second mobility management device may detect restart of the first mobility management device using an echo message. Specifically, the second mobility management device may send an echo request (Echo Request) message to the first mobility management device, and then receive an echo response (Echo Response) message sent by the first mobility management device, where the echo response message includes a restart counter (restart counter) value. The second mobility management device may detect restart of the first mobility management device using the restart counter value. For another example, the first mobility management device sends an echo request (Echo Request) message to the second mobility management device during restart, where the echo request message includes a restart counter (restart counter) value. The second mobility management device may detect restart of the first mobility management device using the restart counter value.

Specifically, the manner in which the second mobility management device detects that the failure of the first mobility management device is non-restart may be but is not limited to the following:

The second mobility management device may detect non-restart of the first mobility management device using an echo message. Specifically, the second mobility management device may send an echo request (Echo Request) message to the first mobility management device, and no echo response (Echo Response) is received yet after the response times out. In this case, the second mobility management device may select to resend the echo request message to the first mobility management device. If the echo request message is still not received after many times of resending, the second mobility management device detects non-restart of the first mobility management device (that is, the failure is non-restart).

Further, after the second mobility management device detects the failure of the first mobility management device, the second mobility management device may further set an ISR deactivation flag, so that the second mobility management device executes different operations according to the ISR deactivation flag.

For example, the second mobility management device may send the first modify bearer request message to the serving gateway according to the ISR deactivation flag when receiving the routing area update (Routing Area Update, RAU) request (RAU Request) message or tracking area update (Tracking Area Update, TAU) request (TAU Request) message.

For another example, the second mobility management device may send the second modify bearer request message to the serving gateway according to the ISR deactivation flag when receiving the service request message or protocol data unit.

For another example, when determining that the user equipment is in a connected state or a ready state, the second mobility management device may trigger, according to the ISR deactivation flag, the UE to initiate an RAU procedure or a TAU procedure, where the second mobility management device may allocate a second location area identity that does not match a current first location area identity of the user equipment to the user equipment, so that the user equipment can trigger, according to the first location area identity and the second location area identity, the UE to initiate an RAU procedure or a TAU procedure, that is, send a routing area update request (RAU Request) message or a tracking area update request (TAU Request) message to the second mobility management device.

For another example, the second mobility management device may send a delete session request message to the serving gateway according to the ISR deactivation flag when determining that the user equipment needs to be detached, so that the serving gateway notifies a packet data network gateway of deleting a corresponding session.

The method for setting, by the second mobility management device, the ISR deactivation flag may include but is not limited to the following manners:

(1) The second mobility management device may set a specific flag in a user equipment context, for example, a ready for ISR deactivation flag (for example, "ready for ISR deactivation Failure Flag").

Specifically, the second mobility management device may set an ISR deactivation flag in the user equipment context once detecting the failure of the first mobility management device. If the ISR deactivation flag already exists in the user equipment context, the ISR deactivation flag is set from invalid to valid. In addition, the second mobility management device deletes the ISR deactivation flag, which means that the ISR deactivation flag is cleared from the user equipment context or that the ISR deactivation flag is set from valid to invalid.

(2) The second mobility management device may set the TEID of the first mobility management device stored in the user equipment context to a specific value.

Specifically, the second mobility management device deletes the ISR deactivation flag, which means that the TEID of the first mobility management device is cleared from the user equipment context or that the TEID is updated and no longer the foregoing specific value.

(3) The second mobility management device may start a specific timer.

Specifically, after the specific timer times out, the second mobility management device may locally deactivate ISR. Generally speaking, a duration of the specific timer is slightly longer than a duration of a specific periodic update timer of the user equipment. In addition, the second mobility management device deletes the ISR deactivation flag, which means that the specific timer is cleared from the user equipment context or that the specific timer stops running.

Further, after the second mobility management device sets the ISR deactivation flag, the second mobility management device may further receive a context acknowledge message sent by the first mobility management device or the another first mobility management device, where the context acknowledge message includes ISR activated indication information, so that the second mobility management device may execute an ISR reactivation operation according to the ISR activated indication information and delete the ISR deactivation flag.

Further, after the second mobility management device sets the ISR deactivation flag, the second mobility management device may further send an RAU accept (RAU Accept) message or a TAU accept (TAU Accept) message to the user equipment, where the routing area update accept message or tracking area update accept message includes ISR deactivated indication information, so that the user equipment executes an ISR deactivation operation. Specifically, the user equipment determines that ISR deactivation is required, and sets a temporary identity used in next update (Temporary Identity used in Next update, TIN) to a specific value.

It can be understood that an implementation solution of this embodiment may not involve a flag setting process, that is, the serving gateway does not set the failure flag of the first mobility management device, and the second mobility management device does not set the ISR deactivation flag. Correspondingly and optionally, after the serving gateway detects the failure of the first mobility management device, the serving gateway may further receive a third modify bearer request message, where the third modify bearer request message includes ISR deactivated indication information. In this case, the serving gateway may execute an ISR deactivation operation (that is, to delete stored connection information of the first mobility management device) according to the ISR deactivated indication information.

The third modify bearer request message is sent after the second mobility management device receives the routing area update request message or tracking area update request message.

Further, in this embodiment, the second mobility management device may detect the failure of the first mobility management device, so that the second mobility management device executes different operations.

For example, the second mobility management device may send the third modify bearer request message to the serving gateway when receiving the routing area update (Routing Area Update, RAU) request (RAU Request) message or tracking area update (Tracking Area Update, TAU) request (TAU Request) message.

For another example, when determining that the user equipment is in a connected state or a ready state, the second mobility management device may trigger the UE to initiate an RAU procedure or a TAU procedure, where the second mobility management device may allocate a second location area identity that does not match a current first location area identity of the user equipment to the user equipment, so that the user equipment can trigger, according to the first location area identity and the second location area identity, the UE to initiate an RAU procedure or a TAU procedure, that is, send a routing area update request (RAU Request) message or a tracking area update request (TAU Request) message to the second mobility management device.

Further, after the second mobility management device detects the failure of the first mobility management device, the second mobility management device may further send an RAU accept (RAU Accept) message or a TAU accept (TAU Accept) message to the user equipment, where the routing area update accept message or tracking area update accept message includes ISR deactivated indication information, so that the user equipment executes an ISR deactivation operation. Specifically, the user equipment determines that ISR deactivation is required, and sets a temporary identity used in next update (Temporary Identity used in Next update, TIN) to a specific value.

In this embodiment, the serving gateway detects the failure of the first mobility management device, and may send a downlink data notification message including identity information of the user equipment to the first mobility management device after receiving downlink user plane or control plane data of the user equipment, so that the first mobility management device can page the user equipment in a first radio access network. This can avoid a problem that in an ISR activated scenario, a mobile terminating service of the UE camping in the first radio access network is interrupted, which is caused by deactivating ISR by the serving gateway because the serving gateway detects the failure of the first mobility management device connected to the first radio access network, thereby improving reliability of the mobile terminating service.

In the method for handling a failure of a mobility management device in an ISR activated scenario in this embodiment, the first radio access network may be an E-UTRAN, and correspondingly, the first mobility management device is an MME; the second radio access network may be a UTRAN/GERAN, and correspondingly, the second mobility management device is an SGSN.

In the method for handling a failure of a mobility management device in an ISR activated scenario in this embodiment, the first radio access network may also be a UTRAN/GERAN, and correspondingly, the first mobility management device is an SGSN; the second radio access network may also be an E-UTRAN, and correspondingly, the second mobility management device is an MME.

To make the method provided by the embodiment of the present invention clearer, the following uses an example where the first radio access network is an E-UTRAN, and correspondingly, the first mobility management device is an MME; the second radio access network is a UTRAN/GERAN, and correspondingly, the second mobility management device is an SGSN.

Figure 2:
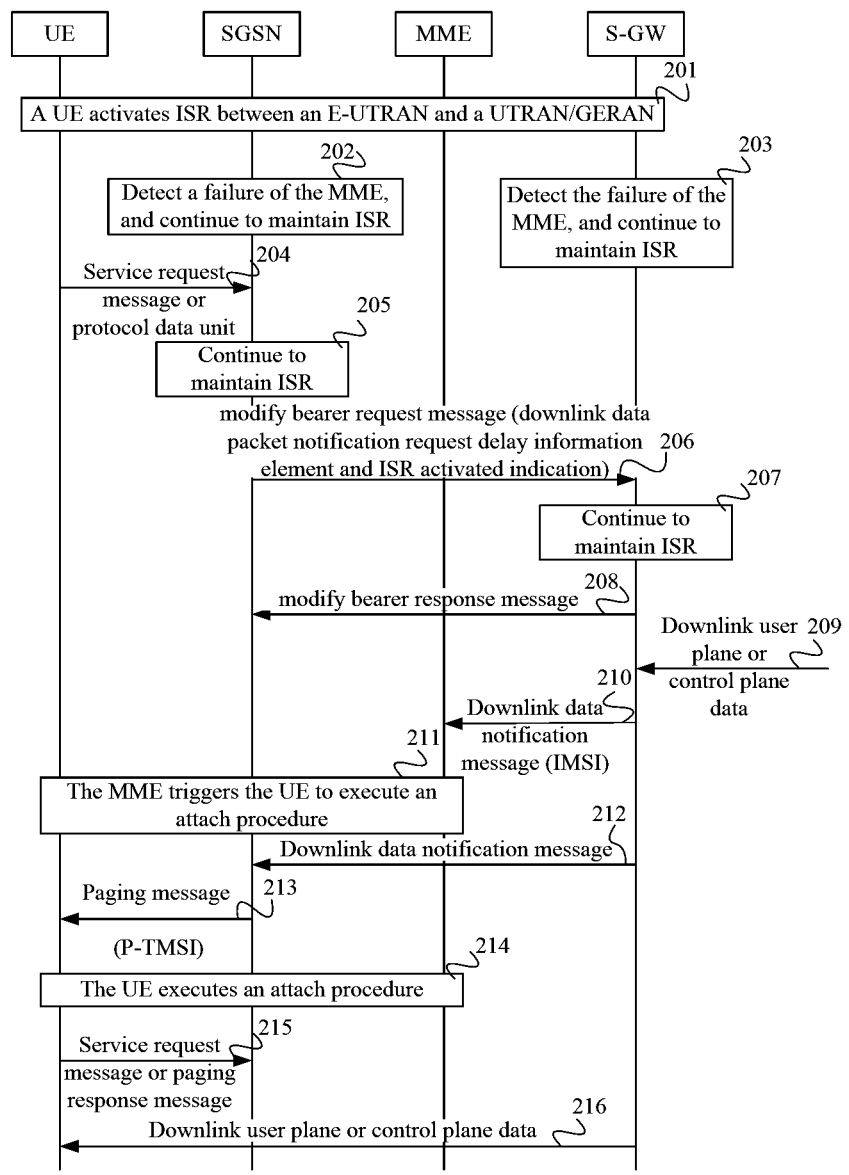
FIG. 2 is a schematic flowchart of a method for handling a failure of a mobility management device in an ISR activated scenario according to another embodiment of the present invention.

FIG. 2 is a schematic flowchart of a method for handling a failure of a mobility management device in an ISR activated scenario according to another embodiment of the present invention. As shown in FIG. 2, the method for handling a failure of a mobility management device in an ISR activated scenario in this embodiment may include the following steps:

201. A UE activates ISR between an E-UTRAN and a UTRAN/GERAN.

Specifically, the UE registers with an MME and an SGSN simultaneously. An S-GW currently serving the UE maintains connections to the MME and SGSN with which the UE registers, that is, the S-GW stores connection information of the MME, which may be, for example, an F-TEID of the MME, or may also be an IP address and a TEID of the MME, and connection information of the SGSN, which may be, for example, an F-TEID of the SGSN, or may also be an IP address and a TEID of the SGSN. The MME and SGSN with which the UE registers store connection information of each other, that is, the MME stores connection information of the SGSN, and the SGSN stores connection information of the MME.

202. The SGSN detects a failure of the MME that is ISR-associated with the SGSN, and continues to store connection information of the MME (that is, continues to maintain ISR).

The method for the SGSN to detect the failure of the MME that is ISR-associated with the SGSN is not further described herein. For details, reference may be made to related content in the embodiment corresponding to FIG. 1.

Optionally, the SGSN may further set an ISR deactivation flag. The detailed method is not further described herein. For details, reference may be made to related content in the embodiment corresponding to FIG. 1.

203. The S-GW detects the failure of the ISR-associated MME, and continues to store connection information of the MME (that is, continues to maintain ISR).

Specifically, the method for the S-GW to detect the failure of the MME that is ISR-associated with the S-GW is not further described herein. For details, reference may be made to related content in the embodiment corresponding to FIG. 1.

Optionally, the S-GW may further set the failure flag of the MME. The detailed method is not further described herein. For details, reference may be made to related content in the embodiment corresponding to FIG. 1.

In this embodiment, the foregoing step 202 and step 203 may not be executed in a fixed sequence.

The procedure for processing a mobile originating service is as follows:

204. The UE sends a service request (Service Request) message or a protocol data unit to the SGSN.

Specifically, the service request procedure corresponds to the UTRAN, and the protocol data unit corresponds to the GERAN.

205. The SGSN continues to maintain ISR.

Specifically, the SGSN detects, according to the processing in step 202, the failure of the MME that is ISR-associated with the SGSN. The SGSN continues to maintain ISR instead of executing an ISR deactivation operation immediately.

Optionally, if the SGSN sets an ISR deactivation flag, the SGSN continues to maintain the ISR deactivation flag. Specifically, the SGSN continues to maintain ISR according to the processing in step 202 and the set ISR deactivation flag, instead of executing an ISR deactivation operation immediately, and continues to store the ISR deactivation flag.

According to an ISR mechanism, after the SGSN receives the service request message or protocol data unit, the SGSN cannot notify the UE of deactivating ISR. Therefore, the SGSN continues to maintain ISR.

206. The SGSN sends a modify bearer request (Modify Bearer Request) message to the S-GW, where the modify bearer request message includes a downlink data packet notification request delay information element and ISR activated (ISR Activated) indication.

Specifically, because the SGSN sends the modify bearer request message to the S-GW after receiving the service request message or protocol data unit, the modify bearer request message includes a downlink data packet notification request delay information element. Because the SGSN determines to continue to maintain ISR according to the processing in step 205, the modify bearer request message sent by the SGSN to the S-GW needs to include ISR activated indication.

207. The S-GW continues to maintain ISR according to the ISR activated indication.

Optionally, if the S-GW sets the failure flag of the MME, the S-GW determines, according to the downlink data packet notification request delay information element, that the modify bearer request message is triggered by the service request message or uplink user plane data, and continues to store the failure flag of the MME.

208. The S-GW sends a modify bearer response (Modify Bearer Response) message to the SGSN.

The procedure for processing a mobile terminating service is as follows:

209. The S-GW receives downlink user plane or control plane data of the UE.

210. The S-GW sends a downlink data notification (Downlink Data Notification) message to the MME, where the downlink data notification message includes an international mobile subscriber identification number (International Mobile Subscriber Identification Number, IMSI).

Specifically, the S-GW detects, according to the processing in step 203, the failure of the ISR-associated MME. If the failure of the MME is restart, the SGSN may send a downlink data notification message carrying an IMSI to the MME or another MME. If the failure of the MME is non-restart, the SGSN may send a downlink data notification message carrying an IMSI to another MME (generally, the another MME and the failed MME are located in a same MME pool).

Optionally, if the S-GW sets the failure flag of the MME, according to the processing in step 203 and the failure flag of the MME, if the failure of the MME is restart, the SGSN sends a downlink data notification message carrying an IMSI to the MME or another MME. If the failure of the MME is non-restart, the SGSN sends a downlink data notification message carrying an IMSI to another MME (generally, the another MME and the failed MME are located in a same MME pool).

211. The MME triggers the UE to execute an attach procedure.

Optionally, the MME may send a paging (Paging) message to the UE, where the paging message includes the IMSI. The UE initiates an attach procedure to the network after receiving the paging message.

Optionally, the MME may further obtain a globally unique temporary identity (Globally Unique Temporary Identity, GUTI)/SAE temporary mobile subscriber identity (SAE Temporary Mobile Subscriber Identity, S-TMSI) of the UE according to an internal register of the MME, and send a paging (Paging) message to the UE, where the paging message includes the GUTI/S-TMSI. After receiving the paging message, the UE first executes a service request procedure, that is, the UE sends a service request message to the MME. Because the MME does not have a UE context, the MME sends a service reject (Service Reject) message to the UE, where a reject cause value included in the service reject message is implicitly detached (Implicitly detached). The UE initiates an attach procedure to the network after receiving the service reject message.

212. The S-GW sends a downlink data notification (Downlink Data Notification) message to the SGSN.

Different from that in step 210, the downlink data notification message does not carry an IMSI, and the SGSN is an SGSN corresponding to the connection information of the SGSN stored by the S-GW.

213. The SGSN sends a paging (Paging) message to the UE, where the paging message includes a packet temporary mobile subscriber identity (Packet Temporary Mobile Subscriber Identity, P-TMSI).

In this embodiment, the foregoing steps 210, 211, 212, and 213 may not be executed in a fixed sequence.

214. If the UE camps in the E-UTRAN (that is, the UE accesses the EPC through the E-UTRAN), the UE executes an attach procedure.

Specifically, in the attach procedure or after the attach procedure is complete, the UE may establish a corresponding user plane bearer.

215. If the UE camps in the UTRAN/GERAN (that is, the UE accesses the EPC through the UTRAN/GERAN), the UE sends a service request message or a paging response message to the SGSN.

Specifically, if the UE camps in the UTRAN (that is, the UE accesses the EPC through the UTRAN), the UE sends a service request message to the SGSN, so that the SGSN recovers a radio access bearer and recovers the user plane bearer with the S-GW; if the UE camps in the GERAN (that is, the UE accesses the EPC through the GERAN), the UE sends a paging response message to the SGSN, so that the SGSN recovers the user plane bearer with the S-GW.

216. The S-GW sends downlink user plane or control plane data to the UE.

In this embodiment, after detecting the failure of the ISR-associated MME, the S-GW can page the UE in the E-UTRAN using a downlink data notification message carrying an IMSI. This can avoid the problem that in an ISR activated scenario, a mobile terminating service of the UE camping in the E-UTRAN is interrupted, which is caused by deactivating ISR by the S-GW because the S-GW detects the failure of the MME connected to the E-UTRAN, thereby improving reliability of the mobile terminating service.

Figure 3:
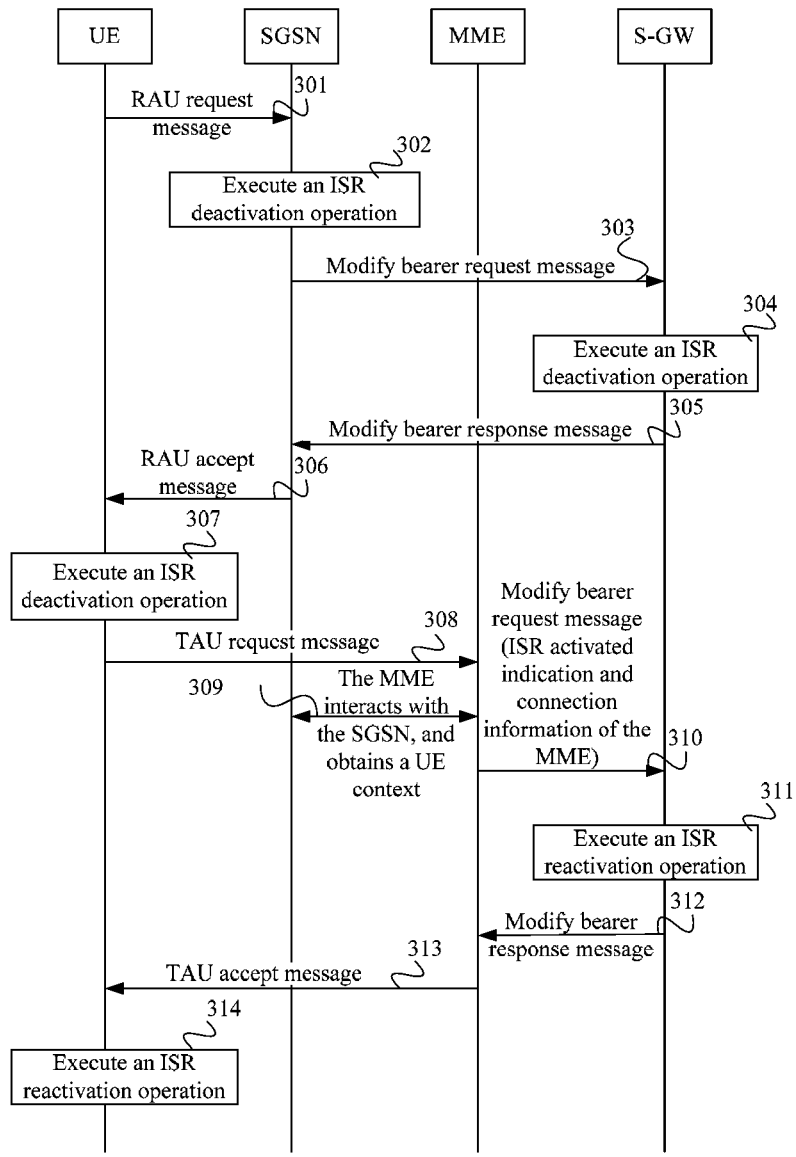
FIG. 3 is a schematic flowchart of a method for handling a failure of a mobility management device in an ISR activated scenario according to another embodiment of the present invention.

FIG. 3 is a schematic flowchart of a method for handling a failure of a mobility management device in an ISR activated scenario according to another embodiment of the present invention. As shown in FIG. 3, compared with the embodiment corresponding to FIG. 2, the method for handling a failure of a mobility management device in an ISR activated scenario in this embodiment after step 216 may further include the following steps:

301. A UE sends a routing area update (Routing Area Update, RAU) request (RAU Request) message to an SGSN.

Optionally, when the UE leaves a registered routing area (Routing Area, RA), the UE may send an RAU request message to the SGSN.

Optionally, when a routing update timer times out, the UE may send an RAU request message to the SGSN.

Optionally, based on the embodiment corresponding to FIG. 2, the SGSN detects a failure of an MME that is ISR-associated with the SGSN and detects that the UE is currently in a connected mode (Connected, corresponding to the UTRAN and E-UTRAN) or ready mode (Ready, corresponding to the GERAN). In this case, the SGSN can proactively trigger the UE to initiate an RAU procedure. Specifically, the SGSN detects the failure of the MME that is ISR-associated with the SGSN. In this case, when determining that the UE is currently in the connected mode or ready mode, the SGSN initiates a P-TMSI relocation procedure (Relocation Procedure) to trigger the UE to initiate an RAU procedure. In the P-TMSI relocation procedure, the SGSN allocates a fake (fake) routing area identity (Routing Area Identity, RAI) to the UE, where the fake RAI is inconsistent with a current RAI of the UE (the current RAI of the UE is reported by a base station control device in the UTRAN/GERAN to the SGSN). According to a principle of initiating an RAU procedure by the UE, if the RAI (the UE stores the RAI allocated by the SGSN, where the RAI indicates a valid registered area) allocated by the SGSN is inconsistent with the RAI (generally, the UE knows, from broadcast information, the identity of the routing area where the UE currently camps) of the RA (routing area) where the UE currently camps, the UE initiates an RAU procedure. That is to say, through the processing of the P-TMSI relocation procedure, the SGSN can trigger the UE to initiate an RAU procedure.

Optionally, based on the embodiment corresponding to FIG. 2, if the SGSN sets an ISR deactivation flag, the SGSN can proactively trigger, according to the ISR deactivation flag and the fact that the UE is currently in the connected (Connected, corresponding to the UTRAN and E-UTRAN) or ready mode (Ready, corresponding to the GERAN), the UE to initiate an RAU procedure. Specifically, according to the ISR deactivation flag, when determining that the UE is currently in the connected mode or ready mode, the SGSN initiates a P-TMSI relocation procedure (Relocation Procedure) to trigger the UE to initiate an RAU procedure. In the P-TMSI relocation procedure, the SGSN allocates a fake (fake) routing area identity (Routing Area Identity, RAI) to the UE, where the fake RAI is inconsistent with the current RAI of the UE (the current RAI of the UE is reported by a base station control device in the UTRAN/GERAN to the SGSN). According to the principle of initiating an RAU procedure by the UE, if the RAI allocated by the SGSN is inconsistent with the currently stored RAI, the UE initiates an RAU procedure. That is to say, with the processing of the P-TMSI relocation procedure, the SGSN can trigger the UE to initiate an RAU procedure.

It can be understood that for the scenario where the SGSN fails, correspondingly, the MME initiates a GUTI relocation procedure (Relocation Procedure). To trigger the UE to initiate a TAU procedure, in the GUTI relocation procedure, the MME allocates a tracking area identity (Tracking Area Identity, TAI) list to the UE, where the TAI list (the UE stores the TAI list allocated by the MME, where the TAI list indicates a valid registered area) does not include the TAI of the TA (tracking area) where the UE currently camps (generally, the UE knows, from broadcast information, the identity of the tracking area where the UE currently camps). According to a trigger condition of the TAU, if the TAI of the TA where the UE currently camps is not in the TAI list allocated by the MME, the UE initiates a TAU procedure.

302. The SGSN executes an ISR deactivation operation.

Specifically, the SGSN detects the failure of the MME that is ISR-associated with the SGSN, and the SGSN receives an RAU request message sent by the UE. In this case, the SGSN executes an ISR deactivation operation.

Optionally, if the SGSN sets the ISR deactivation flag, the SGSN deletes the ISR deactivation flag. Specifically, when the SGSN receives the RAU request message sent by the UE, the SGSN executes an ISR deactivation operation according to the ISR deactivation flag and deletes the ISR deactivation flag.

303. The SGSN sends a modify bearer request (Modify Bearer Request) message to the S-GW, where the modify bearer request message does not include ISR activated (ISR Activated) indication.

304. The S-GW executes an ISR deactivation operation.

Specifically, the modify bearer request message does not include ISR activated indication, which means ISR deactivation. In this case, an ISR deactivation operation is executed.

Optionally, if the S-GW sets a failure flag of the MME, the modify bearer request message does not include ISR activated indication, which means ISR deactivation. In this case, an ISR deactivation operation is executed, and the failure flag of the MME is deleted.

305. The S-GW sends a modify bearer response (Modify Bearer Response) message to the SGSN.

306. The SGSN sends an RAU accept (RAU Accept) message to the UE, where the RAU accept message does not include ISR activated (ISR Activated) indication.

Specifically, the SGSN detects the failure of the MME that is ISR-associated with the SGSN. In this case, the SGSN may send an RAU accept message to the UE, where the RAU accept message does not include ISR activated indication.

Optionally, if the SGSN sets an ISR deactivation flag, the SGSN may send an RAU Accept message to the UE according to the ISR deactivation flag, where the RAU Accept message does not include ISR activated indication.

307. The UE executes an ISR deactivation operation.

Specifically, if a current TIN of the UE is set to a temporary mobile subscriber identity related to a radio access technology (RAT-related TMSI), the TIN of the UE is set to a P-TMSI. If the current TIN of the UE is already set to a P-TMSI, the current TIN remains unchanged.

In addition, according to a trigger mechanism of the TAU, if the TIN of the UE is set to a P-TMSI, the UE initiates a TAU procedure when reselecting an E-UTRAN network.

By executing steps 301-307, the UE and the network synchronize ISR states, both being in the deactivated state.

308. The UE sends a TAU request (TAU Request) to the MME after the UE reselects the E-UTRAN from the UTRAN/GERAN.

The TAU procedure initiated by the UE may be triggered by step 307 or other causes. That is, execution of step 308 is not necessarily associated with steps 301-307.

As described in step 307, according to a trigger condition of initiating a TAU procedure by the UE, if the TIN is set to a P-TMSI, when the UE reselects the E-UTRAN network, the UE initiates a TAU procedure to the MME (a restarted MME or another MME). Apart from the method described in step 307, when a bearer of the UE in the GERAN/UTRAN changes (for example, bearer QoS changes), the UE may locally deactivate ISR according to a principle of ISR, that is, the TIN may be set to a P-TMSI. This embodiment does not exclude other methods that cause the UE to set the TIN to a P-TMSI.

309. The MME interacts with the SGSN, and obtains a UE context.

Specifically, the MME may send a context request (Context Request) message to the SGSN, where the message includes connection information of the MME (IP address and TEID information of the MME). The SGSN sends a context response (Context Response) message to the MME, where the Context Response message includes the UE context and may include information indicating that the SGSN supports ISR. The MME sends a context acknowledge (Context Ack) message to the SGSN. After the MME obtains the UE context, if the MME still selects the S-GW previously serving the UE to provide services for the UE and determines that the SGSN supports ISR, the MME may notify the SGSN of activating ISR. For example, the context acknowledge message may further include ISR activated indication, which is used to instruct the SGSN to execute an ISR reactivation operation. The SGSN executes an ISR reactivation operation according to the ISR activated indication, that is, the stored connection information of the MME is re-stored or updated according to the connection information of the MME included in the context request message. Optionally, if the SGSN sets the ISR deactivation flag, the SGSN deletes the ISR deactivation flag.

310. The MME sends a modify bearer request (Modify Bearer Request) message to the S-GW, where the modify bearer request message includes ISR activated (ISR Activated) indication and connection information of the MME (the IP address and TEID of the MME).

311. The S-GW executes an ISR reactivation operation according to the ISR activated (ISR Activated) indication, that is, the S-GW re-stores or updates the stored connection information of the MME according to the connection information of the MME included in the modify bearer request message.

Optionally, if the S-GW sets the failure flag of the MME, and determines that the modify bearer request message is triggered by the TAU request message, the S-GW deletes the failure flag of the MME.

312. The S-GW sends a modify bearer response (Modify Bearer Response) message to the MME.

313. The MME sends a TAU accept (TAU Accept) message to the UE, where the TAU accept message includes ISR activated indication.

Step 314: The UE executes an ISR reactivation operation.

Specifically, the TIN is set to a temporary mobile subscriber identity related to a radio access technology (RAT-related TMSI).

By executing steps 308-314, the UE and the network synchronize ISR states, both being in the activated state.

Up to now, the UE has registered with the restarted MME or another MME again. The S-GW currently serving the UE maintains connections to the MME and SGSN with which the UE registers, that is, the S-GW stores connection information of the SGSN and MME simultaneously. The connection information of the MME may be, for example, an F-TEID of the MME, or may also be an IP address and a TEID of the MME, and the connection information of the SGSN, which may be, for example, an F-TEID of the SGSN, or may also be an IP address and a TEID of the SGSN. The MME and SGSN with which the UE registers store connection information of each other, that is, the MME stores connection information of the SGSN, and the SGSN stores connection information of the MME. According to an ISR mechanism, the mobile terminating service is reachable to the UE.

In this embodiment, the S-GW executes an ISR deactivation operation and an ISR reactivation operation according to indication of the SGSN; if the S-GW sets the failure flag of the MME, the S-GW may further delete the failure flag of the MME. Therefore, it can be ensured that network resources are not wasted when a mobile terminating service is required.

Figure 4:
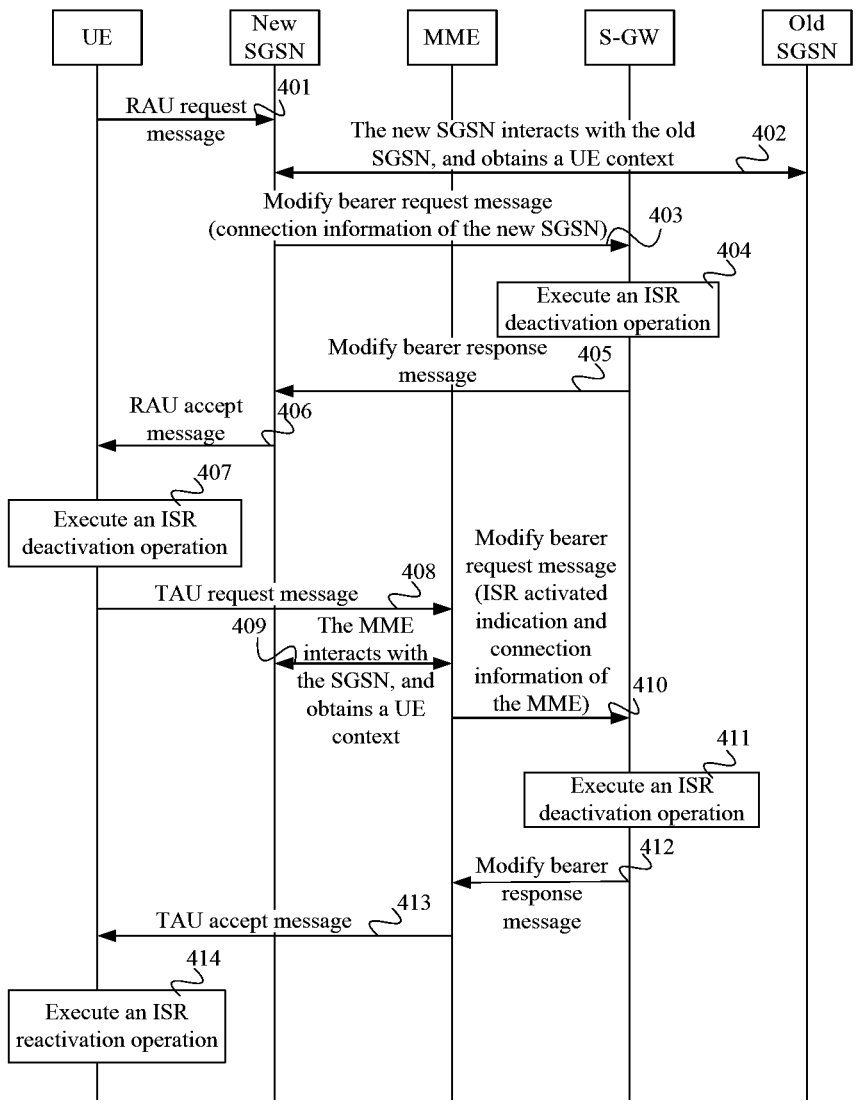
FIG. 4 is a schematic flowchart of a method for handling a failure of a mobility management device in an ISR activated scenario according to another embodiment of the present invention.

FIG. 4 is a schematic flowchart of a method for handling a failure of a mobility management device in an ISR activated scenario according to another embodiment of the present invention. As shown in FIG. 4, compared with the embodiment corresponding to FIG. 2, the method for handling a failure of a mobility management device in an ISR activated scenario in this embodiment after step 216 may further include the following steps:

401. A UE sends a routing area update (Routing Area Update, RAU) request (RAU Request) message to a new SGSN (new SGSN).

The new SGSN is not the old SGSN (old SGSN) previously serving the UE.

402. The new SGSN interacts with the old SGSN, and obtains a UE context.

Specifically, the new SGSN may send a context request (Context Request) message to the old SGSN. The old SGSN sends a context response (Context Response) message to the new SGSN, where the Context Response message includes the UE context. The new SGSN sends a context acknowledge (Context Ack) message to the old SGSN. After obtaining the UE context, the new SGSN still selects the S-GW previous serving the UE to provide services for the UE. In addition, because the original node is an SGSN rather than an MME, the new SGSN does not activate ISR at this time according to a principle of ISR. For example, the context acknowledge message does not include ISR activated indication, and is used to instruct the old SGSN to release the UE context, where the UE context includes restart information of the MME.

403. The new SGSN sends a modify bearer request (Modify Bearer Request) message to the S-GW, where the modify bearer request message does not include ISR activated (ISR Activated) indication but includes connection information of the new SGSN.

404. The S-GW executes an ISR deactivation operation.

Specifically, the modify bearer request does not include ISR activated indication, which means ISR deactivation. In this case, an ISR deactivation operation is executed.

Optionally, if the S-GW sets a failure flag of the MME, the modify bearer request message does not include ISR activated indication, which means ISR deactivation. In this case, an ISR deactivation operation is executed, and the failure flag of the MME is deleted.

405. The S-GW sends a modify bearer response (Modify Bearer Response) message to the new SGSN according to the connection information of the new SGSN.

Optionally, the modify bearer response message may further include connection information of the S-GW.

406. The new SGSN sends an RAU accept (RAU Accept) message to the UE, where the RAU accept message does not include ISR activated (ISR Activated) indication.

407. The UE executes an ISR deactivation operation.

Specifically, if a current TIN of the UE is set to a temporary mobile subscriber identity related to a radio access technology (RAT-related TMSI), the TIN of the UE is set to a P-TMSI. If the current TIN of the UE is already set to a P-TMSI, the current TIN remains unchanged.

In addition, according to a trigger mechanism of the TAU, if the TIN of the UE is set to a P-TMSI, the UE initiates a TAU procedure when reselecting an E-UTRAN network.

By executing steps 401-407, the UE and the network synchronize ISR states, both being in the deactivated state.

Steps 408-414 are not described herein. For details, reference may be made to steps 308-314.

By executing steps 408-414, the UE and the network synchronize ISR states, both being in the activated state.

Up to now, the UE has registered with the restarted MME or another MME again. The S-GW currently serving the UE maintains connections to the MME and SGSN with which the UE registers, that is, the S-GW stores connection information of the SGSN and MME simultaneously. The connection information of the MME may be, for example, an F-TEID of the MME, or may also be an IP address and a TEID of the MME, and the connection information of the SGSN, which may be, for example, an F-TEID of the SGSN, or may also be an IP address and a TEID of the SGSN. The MME and SGSN with which the UE registers store connection information of each other, that is, the MME stores connection information of the SGSN, and the SGSN stores connection information of the MME. According to an ISR mechanism, a mobile terminating service is reachable to the UE.

In this embodiment, the S-GW executes an ISR deactivation operation and an ISR reactivation operation according to indication of the new SGSN; if the S-GW sets the failure flag of the MME, the S-GW may further delete the failure flag of the MME. Therefore, it can be ensured that network resources are not wasted when a mobile terminating service is required.

It should be noted that, for ease of description, the foregoing method embodiments are described as a series of actions. However, those skilled in the art should know that the present invention is not limited by the sequence of the actions described herein, because according to the present invention, some actions may occur in other sequences or simultaneously. In addition, those skilled in the art should also know that the embodiments in the specification are all exemplary embodiments and actions and modules involved in these embodiments are not necessarily required for the present invention.

In the foregoing embodiments, each embodiment has its emphasis. For what is not detailed in one embodiment, reference may be made to related description of other embodiments.

Figure 5:
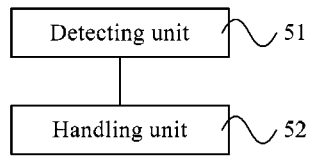
FIG. 5 is a schematic structural diagram of a serving gateway in an ISR activated scenario according to another embodiment of the present invention.

FIG. 5 is a schematic structural diagram of a serving gateway in an ISR activated scenario according to another embodiment of the present invention. As shown in FIG. 5, the serving gateway in the ISR activated scenario in this embodiment may include a detecting unit 51 and a handling unit 52. The detecting unit 51 is configured to detect a failure of a first mobility management device. The handling unit 52 is configured to: when downlink user plane or control plane data of a user equipment is received, page the user equipment using a downlink data notification message including identity information of the user equipment, in a first radio access network connected to the first mobility management device; and page the user equipment using a downlink data notification message not including identity information of the user equipment, in a second radio access network connected to a second mobility management device.

All functions of the serving gateway in the embodiment corresponding to FIG. 1 and those of the P-GW in the embodiments corresponding to FIG. 2 to FIG. 4 may be implemented by the serving gateway in the ISR activated scenario according to this embodiment.

In a certain scenario, if the detecting unit 51 in this embodiment detects that the failure of the first mobility management device is restart, correspondingly, the handling unit 52 may send a downlink data notification message including identity information of the user equipment to the first mobility management device or another mobility management device of a same device type as the first mobility management device, so as to trigger the first mobility management device or the another mobility management device to page the user equipment in the first radio access network.

In a certain scenario, if the detecting unit 51 in this embodiment detects that the failure of the first mobility management device is non-restart, correspondingly, the handling unit 52 may further send a downlink data notification message including identity information of the user equipment to another mobility management device of a same device type as the first mobility management device, so as to trigger the first mobility management device or the another mobility management device to page the user equipment in the first radio access network.

Figure 6:
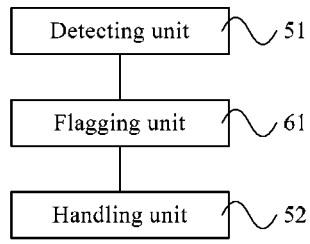
FIG. 6 is another schematic structural diagram of a serving gateway in an ISR activated scenario according to another embodiment of the present invention.

Further, as shown in FIG. 6, the serving gateway in the ISR activated scenario in this embodiment may further include a flagging unit 61, configured to set a failure flag of the first mobility management device.

Optionally, the flagging unit 61 may further receive a first modify bearer request message, where the first modify bearer request message includes ISR deactivated indication information, and execute an ISR deactivation operation, and delete the failure flag.

Optionally, the flagging unit 61 may further receive a second modify bearer request message, where the second modify bearer request message includes ISR activated indication information; if it is determined that the second modify bearer request message is triggered by a service request message or a protocol data unit, continue to maintain ISR and store the failure flag; if it is determined that the second modify bearer request message is triggered by a routing area update request message or a tracking area update request message, execute an ISR reactivation operation, and delete the failure flag.

In this embodiment, the serving gateway detects the failure of the first mobility management device using a detecting unit, and may send a downlink data notification message including identity information of the user equipment to the first mobility management device after the handling unit receives downlink user plane or control plane data of the user equipment, so that the first mobility management device can page the user equipment in a first radio access network. This can avoid the problem that in an ISR activated scenario, a mobile terminating service of the UE camping in the first radio access network is interrupted, which is caused by deactivating ISR by the serving gateway because the serving gateway detects the failure of the first mobility management device connected to the first radio access network, thereby improving reliability of the mobile terminating service.

Figure 7:
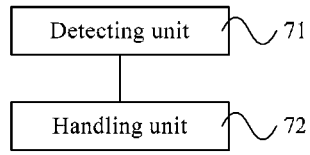
FIG. 7 is a schematic structural diagram of a mobility management device in an ISR activated scenario according to another embodiment of the present invention.

FIG. 7 is a schematic structural diagram of a mobility management device in an ISR activated scenario according to another embodiment of the present invention. As shown in FIG. 7, the mobility management device in the ISR activated scenario in this embodiment may include a detecting unit 71 and a handling unit 72. The detecting unit 71 is configured to detect a failure of another mobility management device of a device type different from the mobility management device. The handling unit 72 is configured to: when a routing area update request message or a tracking area update request message is received, send a first modify bearer request message to a serving gateway, where the first modify bearer request message includes ISR deactivated indication information, or when a service request message or a protocol data unit is received, send a second modify bearer request message to a serving gateway, where the second modify bearer request message includes ISR activated indication information, or when it is determined that a user equipment needs to be detached, send a delete session request message to a serving gateway, so that the serving gateway notifies a packet data network gateway of deleting a corresponding session.

All functions of the second mobility management device in the embodiment corresponding to FIG. 1 and those of the SGSN in the embodiments corresponding to FIG. 2 to FIG. 4 may be implemented by the mobility management device in the ISR activated scenario according to this embodiment.

Further, in this embodiment, when it is determined that the user equipment is in a connected state or a ready state, the handling unit 72 may further trigger the user equipment to initiate a routing area update procedure or a tracking area update procedure, so that the first modify bearer request message is sent to the serving gateway when the routing area update request message or tracking area update request message is received.

Figure 8:
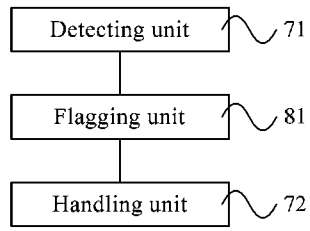
FIG. 8 is another schematic structural diagram of a mobility management device in an ISR activated scenario according to another embodiment of the present invention.

Further, as shown in FIG. 8, the mobility management device in the ISR activated scenario in this embodiment may further include a flagging unit 81, configured to set an ISR deactivation flag; correspondingly, the handling unit 72 may further send the first modify bearer request message to the serving gateway according to the ISR deactivation flag when the routing area update request message or tracking area update request message is received, or send the second modify bearer request message to the serving gateway according to the ISR deactivation flag when the service request message or protocol data unit is received, or send the delete session request message to the serving gateway according to the ISR deactivation flag when it is determined that the user equipment needs to be detached, so that the serving gateway notifies the packet data network gateway of deleting the corresponding session.

Further, when it is determined that the user equipment is in the connected state or ready state, the handling unit 72 may further trigger, according to the ISR deactivation flag, the user equipment to initiate a routing area update procedure or tracking area update procedure, so that the first modify bearer request message is sent to the serving gateway according to the ISR deactivation flag when the routing area update request message or tracking area update request message is received.

Further, the flagging unit 81 may further receive a context acknowledge message sent by the another mobility management device or a mobility management device of a same type as the another mobility management device, where the context acknowledge message includes ISR activated indication information, and execute an ISR reactivation operation, and delete the ISR deactivation flag.

Further, the flagging unit 81 may further send a routing area update accept message or a tracking area update accept message to the user equipment, where the routing area update accept message or tracking area update accept message includes ISR deactivated indication information, so that the user equipment executes an ISR deactivation operation.

In this embodiment, the mobility management device instructs the serving gateway to execute an ISR deactivation operation and an ISR reactivation operation; if the serving gateway S-GW sets a failure flag of another mobility management device of a type different from the mobility management device, the failure flag of the another mobility management device of a type different from the mobility management device may be further deleted. Therefore, it can be ensured that network resources are not wasted when a mobile terminating service is required.

A person of ordinary skill in the art may understand that, all or a part of the steps of the foregoing method embodiments may be implemented by a program instructing relevant hardware. The program may be stored in a computer readable storage medium. When the program runs, the steps of the foregoing method embodiments are performed. The storage medium may be any medium that is capable of storing program codes, such as a ROM, a RAM, a magnetic disk or an optical disc.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that he may still make modifications to the technical solutions described in the foregoing embodiments or make equivalent replacements to some technical features thereof, without departing from the spirit and scope of the technical solutions of the embodiments of the present invention.

What is claimed is:

1. A method for handling a failure of a mobility management device in an idle mode signaling reduction (ISR) activated scenario, comprising:
   detecting, by a serving gateway, a failure of a first mobility management device; and
   when the serving gateway receives downlink user plane or control plane data of a user equipment,
      paging, by the serving gateway, the user equipment using a first downlink data notification message comprising identity information of the user equipment, in a first radio access network connected to the first mobility management device; and
      paging, by the serving gateway, the user equipment using a second downlink data notification message not comprising the identity information of the user equipment, in a second radio access network connected to a second mobility management device.

2. The method according to claim 1, wherein:
   when the failure of the first mobility management device detected by the serving gateway is restart, the paging, by the serving gateway, the user equipment, comprises:
   sending, by the serving gateway, the first downlink data notification message comprising the identity information of the user equipment to the first mobility management device or another mobility management device of a same device type as the first mobility management device, so as to trigger the first mobility management device or the another mobility management device to page the user equipment in the first radio access network; or
   when the failure of the first mobility management device detected by the serving gateway is non-restart, the paging, by the serving gateway, the user equipment, comprises: sending, by the serving gateway, the first downlink data notification message comprising the identity information of the user equipment to the first mobility management device or the another mobility management device of the same device type as the first mobility management device, so as to trigger the first mobility management device or the another mobility management device to page the user equipment in the first radio access network.

3. The method according to claim 1, wherein: after the serving gateway detects the failure of the first mobility management device, the method further comprises: setting, by the serving gateway, a failure flag of the first mobility management device; and
   when the serving gateway receives the downlink user plane or control plane data of the user equipment, the paging, by the serving gateway, the user equipment, comprises:
   when the serving gateway receives the downlink user plane or control plane data of the user equipment, paging, by the serving gateway according to the failure flag, the user equipment using the first downlink data notification message comprising the identity information of the user equipment, in the first radio access network connected to the first mobility management device.

4. The method according to claim 3, wherein after the serving gateway sets the failure flag of the first mobility management device, the method further comprises:
   receiving, by the serving gateway, a first modify bearer request message, wherein the first modify bearer request message comprises the ISR deactivated indication information, and executing, by the serving gateway, an ISR deactivation operation, and deleting the failure flag; or
   receiving, by the serving gateway, a second modify bearer request message, wherein the second modify bearer request message comprises ISR activated indication information, and if the serving gateway determines that the second modify bearer request message is triggered by a service request message or a protocol data unit, continuing, by the serving gateway, to maintain ISR and store the failure flag, or if the serving gateway determines that the second modify bearer request message is triggered by a routing area update request message or a tracking area update request message, executing, by the serving gateway, an ISR reactivation operation, and deleting the failure flag.

5. The method according to claim 4, wherein after the serving gateway receives the second modify bearer request message, the method further comprises:
   determining, by the serving gateway, a trigger condition of the second modify bearer request message according to whether the second modify bearer request message comprises a downlink data notification request delay information element; and
   if the second modify bearer request message comprises the downlink data notification request delay information element, determining that the second modify bearer request message is triggered by the service request message or the protocol data unit; or
   if the second modify bearer request message does not comprise the downlink data notification request delay information element, determining that the second modify bearer request message is triggered by the routing area update request message or the tracking area update request message.

6. The method according to claim 4, wherein the first modify bearer request message is sent after the second mobility management device receives the routing area update request message or the tracking area update request message.

7. The method according to claim 1, wherein after the serving gateway detects the failure of the first mobility management device, the method further comprises:
   receiving, by the serving gateway, a third modify bearer request message, wherein the third modify bearer request message comprises ISR deactivated indication information, and executing, by the serving gateway, an ISR deactivation operation.

8. The method according to claim 7, wherein the third modify bearer request message is sent after the second mobility management device receives a routing area update request message or a tracking area update request message.

9. A serving gateway in an idle mode signaling reduction (ISR) activated scenario, comprising:
   a detecting unit, configured to detect a failure of a first mobility management device; and
   a handling unit, configured to: when downlink user plane or control plane data of a user equipment is received, page the user equipment using a first downlink data notification message comprising identity information of the user equipment, in a first radio access network connected to the first mobility management device; and page the user equipment using a second downlink data notification message not comprising the identity information of the user equipment, in a second radio access network connected to a second mobility management device.

10. The serving gateway according to claim 9, wherein: the detecting unit detects that the failure of the first mobility management device is restart, and the handling unit is configured to send the first downlink data notification message comprising the identity information of the user equipment to the first mobility management device or another mobility management device of a same device type as the first mobility management device, so as to trigger the first mobility management device or the another mobility management device to page the user equipment in the first radio access network; or the detecting unit detects that the failure of the first mobility management device is non-restart, and the handling unit is configured to send the first downlink data notification message comprising the identity information of the user equipment to the first mobility management device or the another mobility management device of the same device type as the first mobility management device, so as to trigger the first mobility management device or the another mobility management device to page the user equipment in the first radio access network.

11. The serving gateway according to claim 9, wherein the serving gateway further comprises a flagging unit, configured to set a failure flag of the first mobility management device.

12. The serving gateway according to claim 11, wherein the flagging unit is further configured to:

receive a first modify bearer request message, wherein the first modify bearer request message comprises ISR deactivated indication information, and execute an ISR deactivation operation, and delete the failure flag; or receive a second modify bearer request message, wherein the second modify bearer request message comprises ISR activated indication information, and if it is determined that the second modify bearer request message is triggered by a service request message or a protocol data unit, continue to maintain ISR and store the failure flag, or if it is determined that the second modify bearer request message is triggered by a routing area update request message or a tracking area update request message, execute an ISR reactivation operation, and delete the failure flag.

13. A mobility management device in an idle mode signaling reduction (ISR) activated scenario, comprising:

a detecting unit, configured to detect a failure of a different mobility management device; and a handling unit, configured to:

when a routing area update request message or a tracking area update request message is received, send a first modify bearer request message to a serving gateway, wherein the first modify bearer request message comprises ISR deactivated indication information, or when a service request message or a protocol data unit is received, send a second modify bearer request message to the serving gateway, wherein the second modify bearer request message comprises ISR activated indication information, or when it is determined that a user equipment needs to be detached, send a delete session request message to the serving gateway to notify a packet data network gateway of deleting a corresponding session.

14. The mobility management device according to claim 13, wherein the handling unit is further configured to:

when it is determined that the user equipment is in a connected state or a ready state, trigger the user equipment to initiate a routing area update procedure or a tracking area update procedure, so that the first modify bearer request message is sent to the serving gateway when the routing area update request message or the tracking area update request message is received.

15. The mobility management device according to claim 13, wherein the mobility management device further comprises a flagging unit, configured to set an ISR deactivation flag, wherein the handling unit is configured to:

send the first modify bearer request message to the serving gateway according to the ISR deactivation flag when the routing area update request message or the tracking area update request message is received, or send the second modify bearer request message to the serving gateway according to the ISR deactivation flag when the service request message or the protocol data unit is received, or when it is determined that the user equipment needs to be detached, send the delete session request message to the serving gateway according to the ISR deactivation flag to notify the packet data network gateway of deleting the corresponding session.

16. The mobility management device according to claim 15, wherein the handling unit is further configured to:

when it is determined that the user equipment is in the connected state or the ready state, trigger, according to the ISR deactivation flag, the user equipment to initiate the routing area update procedure or the tracking area update procedure, so that the first modify bearer request message is sent to the serving gateway according to the ISR deactivation flag when the routing area update request message or the tracking area update request message is received.

17. The mobility management device according to claim 15, wherein the flagging unit is further configured to:

receive a context acknowledge message sent by the different mobility management device or another mobility management device of a same type as the different mobility management device, wherein the context acknowledge message comprises ISR activated indication information, and execute an ISR reactivation operation, and delete the ISR deactivation flag.

18. The mobility management device according to claim 15, wherein the flagging unit is further configured to:

send a routing area update accept message or a tracking area update accept message to the user equipment, wherein the routing area update accept message or the tracking area update accept message comprises ISR deactivated indication information, so that the user equipment executes an ISR deactivation operation.

* * * * *